E. BADER.
INJECTING DEVICE FOR DIESEL MOTORS.
APPLICATION FILED DEC. 12, 1911.
1,060,151. Patented Apr. 29, 1913.
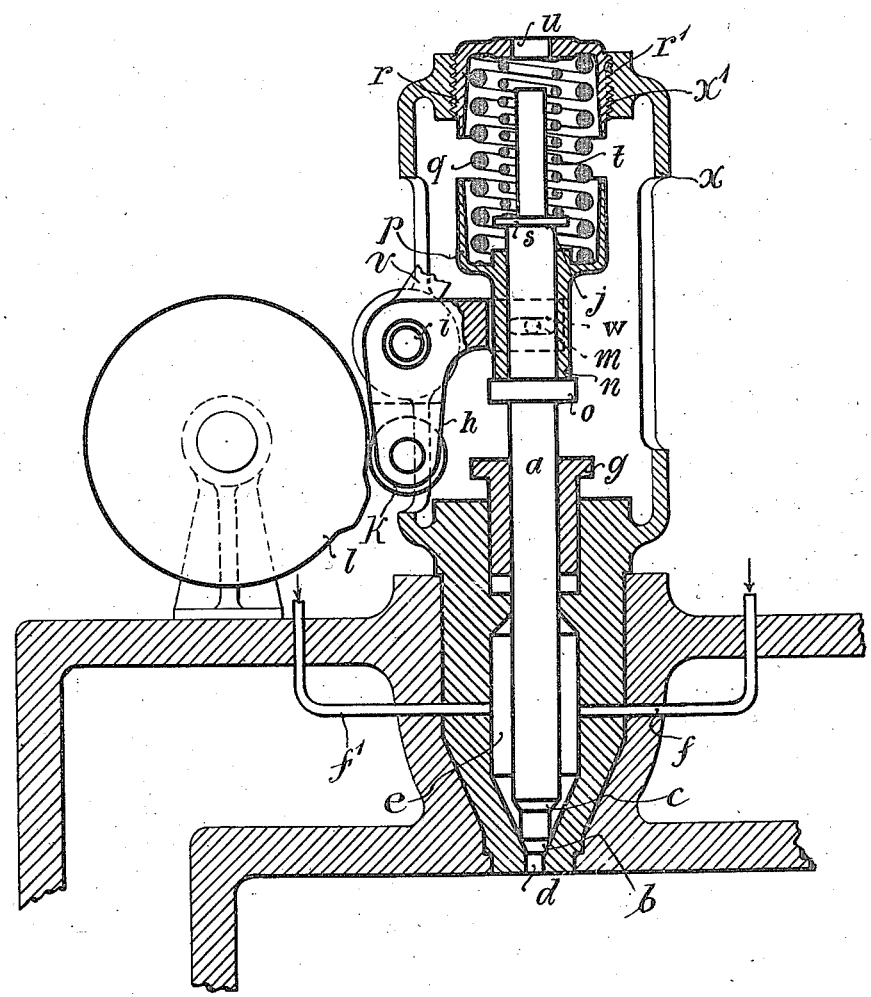

UNITED STATES PATENT OFFICE.

EMIL BADER, OF NUREMBERG, GERMANY, ASSIGNOR TO MASCHINENFABRIK AUGSBURG-NÜRNBERG A. G., OF NUREMBERG, GERMANY.

INJECTING DEVICE FOR DIESEL MOTORS.

1,060,151.
Specification of Letters Patent.
Patented Apr. 29, 1913.

Application filed December 12, 1911. Serial No. 665,340.

*To all whom it may concern:*

Be it known that I, EMIL BADER, a subject of the Empire of Germany, residing at Nuremberg, in the Empire of Germany, have invented a new and useful Injecting Device for Diesel Motors, of which the following is a specification.

Ordinary Diesel motors adapted to be started by means of compressed air are usually so arranged, that the valve for injecting liquid combustible remains closed during the start, so as to prevent the compressed air from entering the supply tube for the liquid combustible. This is effected in the manner that the gear for operating the injecting valve is withdrawn during the start, that is by shifting the fulcrum of the lever for operating the valve by means of an eccentric, whereby the transmission of motion from the respective cam disk to the valve is interrupted.

My invention relates to improvements in valve gears for Diesel motors, whereby the shifting of the fulcrum of any lever is rendered unnecessary.

One improvement consists in providing the injecting needle or valve with an annular piston, upon which the compressed air used for the injection of liquid combustible is permitted to act for opening the needle or valve.

Another improvement consists in providing two concentric helical springs bearing both with one end against some support and severally with the other end against a collar on the valve spindle and against a sleeve movable on the valve spindle. The sleeve is adapted to normally bear against a second collar on the spindle and is pivotally connected with a lever operated from the cam disk. Then the sleeve will normally transmit the pressure of the outer spring to the second collar on the valve spindle and on being operated from the cam disk it will remove this pressure from the valve. The area of the annular piston and the pressure of the two helical springs are so adjusted, that the outer spring in conjunction with the inner spring can normally overcome the pressure of the compressed air used for the injection upon the annular piston and close the valve, while on the sleeve being operated from the cam disk the outer spring is rendered inactive and the tension of the inner spring can be overcome by the pressure of the compressed air upon the annular piston for opening the valve. During the start of the motor the supply of compressed air used for the injection is shut off, while the compressed air used for starting is prevented from acting upon the annular piston, so that the valve remains closed.

I will now proceed to describe my invention with reference to the accompanying drawing, which represents a vertical longitudinal section through the improved injecting device, a part of the lever being shown in elevation and the cam disk in outlines.

$a$ is a valve spindle, the lower conical end $b$ of which serves as a valve and normally closes the nozzle $d$. Above the valve $b$ the nozzle widens to form a chamber $e$, to which the mixture of liquid combustible and compressed air is supplied through tubes $f$, $f^1$. This supply is to be opened and shut off in any known manner. Within the chamber $e$ the valve spindle $a$ is provided with a shoulder $c$ above the valve $b$, which shoulder forms an annular piston. The valve spindle $a$ is tightened by means of a suitable stuffing-box $g$. Outside the latter the valve spindle $a$ is provided with a collar $o$ below and a shoulder $j$ above. A loose collar $s$ is put over the upper reduced part of the spindle $a$ and made to bear against the shoulder $j$. A sleeve $n$ integral with a cup $p$ is put over the spindle $a$. This sleeve normally bears against the collar $o$. Two concentric helical springs $q$ and $t$ are provided, of which the inner spring $t$ is adapted to bear with its lower end against the loose collar $s$ and the outer spring $q$ is made to bear with its lower end against the bottom of the cup $p$. Both springs $q$ and $t$ are made to bear with their upper ends against the bottom of a second cup $r$, which can be vertically adjusted by means of its exterior threaded portion $r^1$, for instance, by inserting a tool within its opening $u$. This threaded portion $r^1$ engages with a threaded portion $x^1$ of a bracket or support $x$ on the motor.

A bent lever $h$ is mounted to rock on a pin $i$ on a support $v$. This lever carries in its lower forked arm a roller $k$, which is adapted to roll on the periphery of a cam disk $l$ driven from the motor. The sleeve $n$ is provided with two opposite pins $m$, which engage in slots $w$ in the horizontal portion of the forked arm of the lever $h$.

It will be understood, that during the work of the motor the lever $h$ is by means of the roller $k$ periodically rocked from the cam disk $l$. Normally the valve spindle $a$ is subjected to the combined pressure of the two springs $q$ and $t$, which combined pressure is so adjusted as to be sufficient for closing the valve $b$ while overcoming the pressure of the compressed air used for the injection and admitted to the chamber $e$ through the tube $f$ and acting upon the annular piston $c$. The inner spring $t$ is so adjested, that its tension can be overcome by the pressure of the compressed air upon the piston $c$ at the moment that the lever $h$ is operated from the cam disk $l$ and compresses the outer spring $q$ upward while moving the sleeve $n$ off from the collar $o$, in other words while removing the pressure of the spring $q$ upon the collar $o$, so that the valve $b$ will open and permit the liquid combustible to be injected into the cylinder (not shown). The area of the lower surface of the valve $b$ is so adjusted, that the compressed air admitted to the cylinder for starting the motor and acting upon the lower surface of the valve $b$ can not open the latter, if the supply of compressed air used for the injection and entering the chamber $e$ through the tube $f$ is shut off. In general the pressure of the compressed air used for starting the motor is essentially smaller than the pressure of the compressed air used for injecting the liquid combustible into the cylinder. During the start of the motor the supply of the compressed air for the injection requires to be shut off. Then the valve $b$ will remain closed during the start and no compressed air can enter the chamber $e$ and act upon the annular piston $c$.

I claim:

1. In a Diesel motor, in combination, a cylinder, a nozzle adapted to be connected with the cylinder and comprising a chamber, a spindle guided in said nozzle and reduced in diameter at the inner end so as to form a valve for closing the outlet of the nozzle, and a shoulder exposed to the pressure in the chamber, means for supplying liquid combustible and compressed air to the chamber of said nozzle, said spindle having outside said nozzle two collars, two concentric helical springs surrounding said spindle and severally bearing with their inner end against the two collars of the spindle, a cup on said springs pressing them normally toward the tapered end of said spindle, and means operated from the motor for periodically pressing the outer spring away from the corresponding collar.

2. In a Diesel motor, in combination, a cylinder, a nozzle adapted to be connected with the cylinder and comprising a chamber, a spindle guided in said nozzle and reduced in diameter at the inner end so as to form a valve for closing the outlet of the nozzle, and a shoulder exposed to the pressure in the chamber, means for supplying liquid combustible and compressed air to the chamber of said nozzle, a stuffing-box for tightening said spindle in said nozzle, said spindle having outside said stuffing-box two collars, a sleeve movable on said spindle between the two collars, a vertically adjustable cup, an inner helical spring surrounding said spindle between its outer collar and said cup, an outer helical spring surrounding said inner spring between said sleeve and said cup, and means operated from the motor for periodically moving said sleeve away from the inner collar of said spindle.

3. In a Diesel motor, in combination, a cylinder, a nozzle adapted to be connected with the cylinder and comprising a chamber, a spindle guided in said nozzle and reduced in diameter at the inner end so as to form a valve for closing the outlet of the nozzle, and a shoulder exposed to the pressure in the chamber, a tube for supplying liquid combustible and compressed air to the chamber of said nozzle, a stuffing-box for tightening said spindle in said nozzle, said spindle having outside said stuffing-box two collars, a sleeve movable on said spindle between the two collars, a vertically adjustable cup, an inner helical spring surrounding said spindle between its outer collar and said cup, an outer helical spring surrounding said inner spring between said sleeve and said cup, a cam disk driven from the motor, a bent lever rocking on the frame of the motor and having forked arms, a roller in one forked arm of said lever adapted to roll on the periphery of said cam disk, and two opposite pins secured in said sleeve and engaging in slots in the other forked arm of said lever.

4. In a Diesel motor, a cylinder, and an injecting device comprising essentially a valve with chamber, means for supplying liquid combustible and compressed air to said chamber, a spindle with collar and sleeve on said collar adapted to close the valve, two concentric helical springs around said spindle one adapted to press the spindle normally downward for closing the valve, and the other adapted to press downward the sleeve on the collar of the spindle, and a cam disk operated rocking lever for periodically compressing the helical springs to open the valve.

EMIL BADER.

Witnesses:
Oscar Bock,
Ralph W. Dox.